Figure 1:
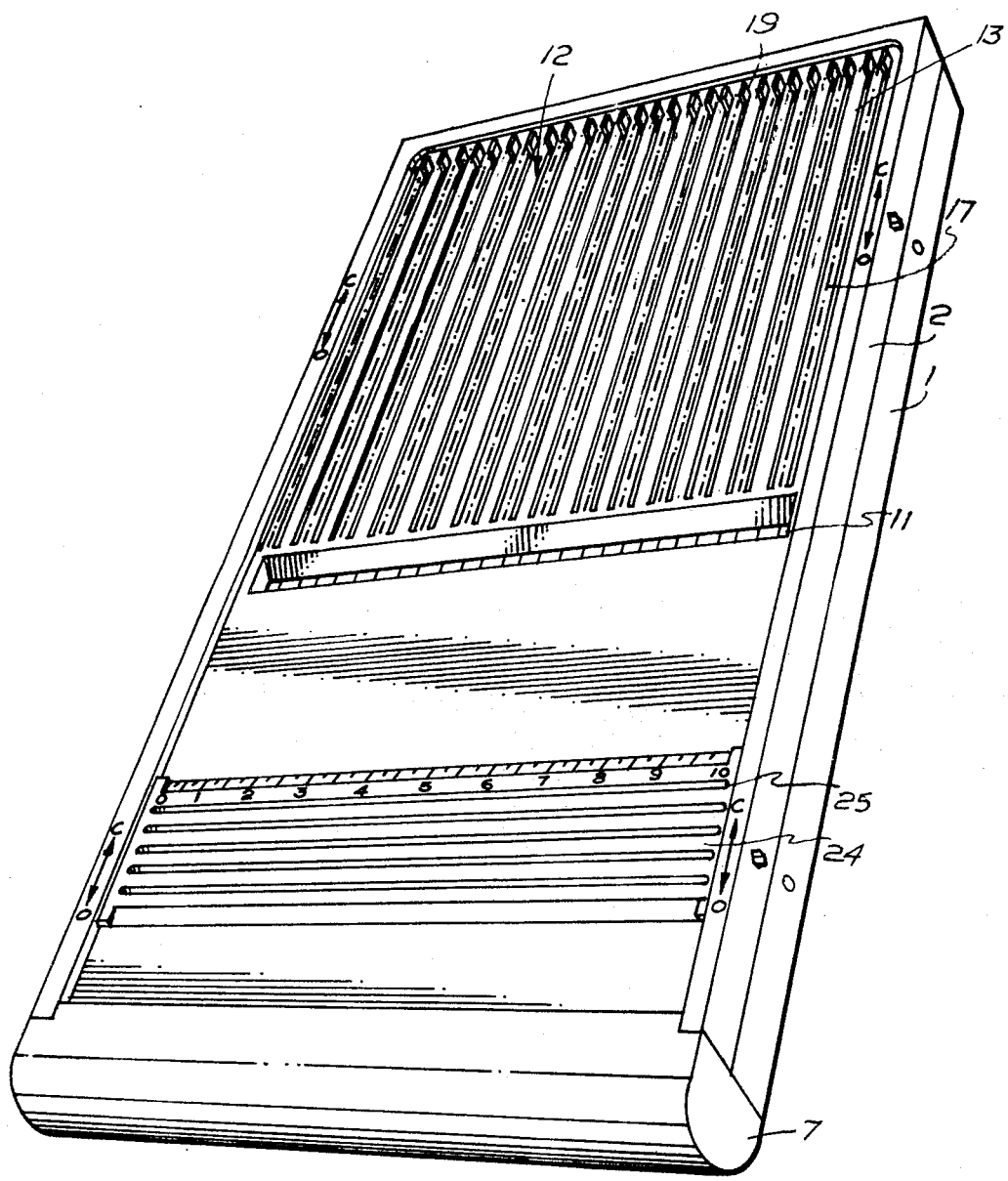

United States Patent [19]
Robinson et al.

[11] 3,757,433
[45] Sept. 11, 1973

[54] APPARATUS FOR FORMING AND DISPLAYING WORDS OR NUMERALS OR A SERIES OF NUMERALS AND SYMBOLS

[76] Inventors: John Joseph Robinson, 24 Ardee Rd.; Frederick Hibbert, 9 Broadgate, both of Preston, Lancaster, England

[22] Filed: Oct. 18, 1971

[21] Appl. No.: 189,911

[30] Foreign Application Priority Data
Oct. 23, 1970 Great Britain.................. 50,401/70

[52] U.S. Cl..................................... 35/75, 35/35 H
[51] Int. Cl. ............................................. G09b 1/28
[58] Field of Search................... 35/35 G, 35 H, 75, 35/2, 31 E; 281/6

[56] References Cited
UNITED STATES PATENTS
1,286,157  11/1918  Vizcarra ............................... 35/75
1,094,570  4/1914  Jacobs ................................... 35/75
1,006,711  10/1911  Atwater ................................. 281/6

*Primary Examiner*—Wm. H. Grieb
*Attorney*—Norris & Bateman

[57] ABSTRACT

Apparatus for displaying letters, numerals and symbols for teaching educational subjects comprising a frame formed in two substantially identical sections mounted one above the other and formed with a plurality of parallel longitudinal slots in one half of each section, identical columns of letters, numerals and symbols being inscribed on the lands between the slots, and slider strips mounted to slide between the sections in the slots movement of each strip bringing the letters, numeral or symbol selected on one section into a transverse window slot in the frame to enable, by the selection of the required letters, numerals or symbols, words, sentences or mathematical expressions to be displayed in the window slot, the ends of the strips remote from the selected letter, numeral or symbol sliding into the end of the frame remote from the longitudinal slots.

7 Claims, 10 Drawing Figures

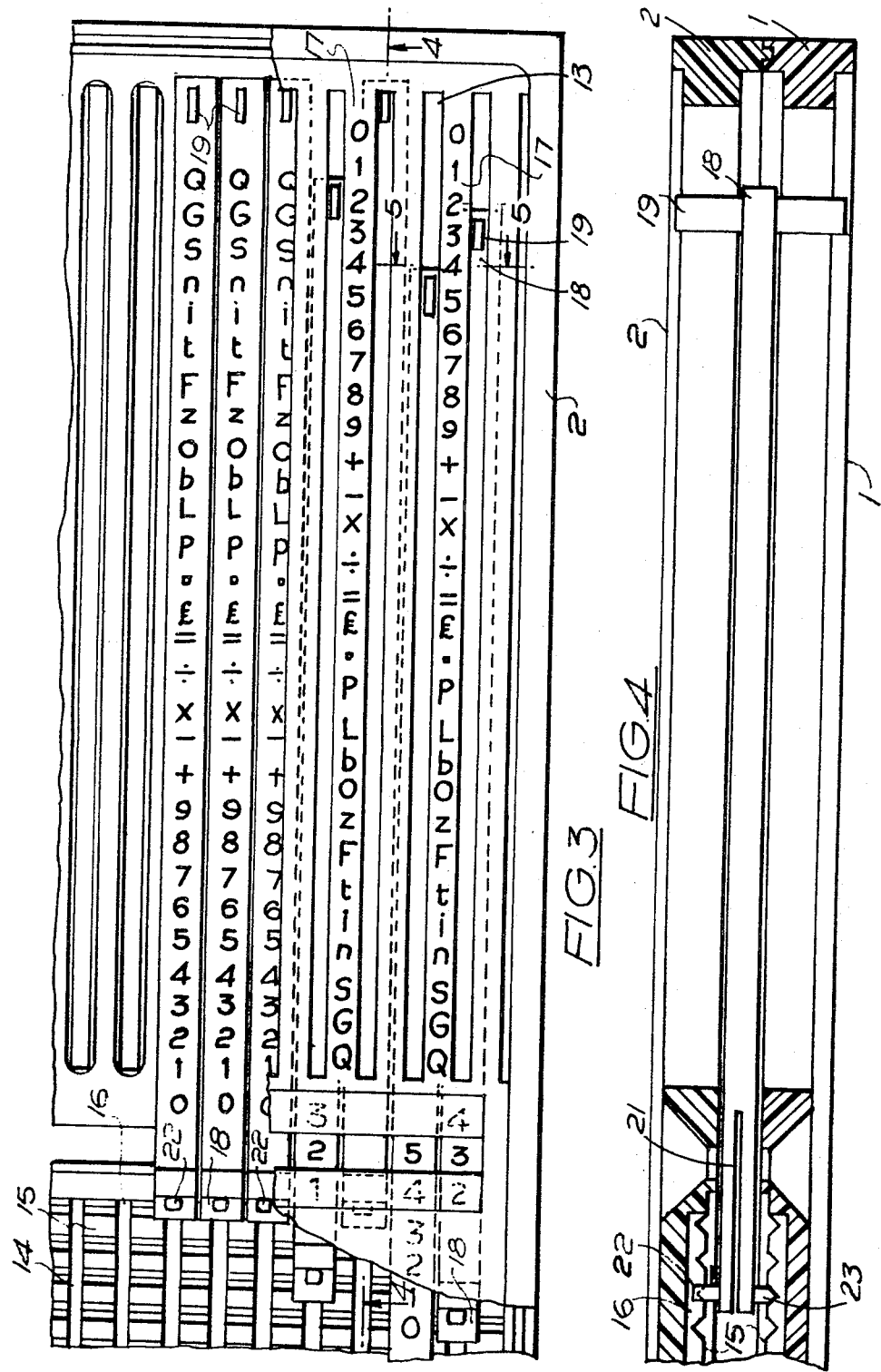

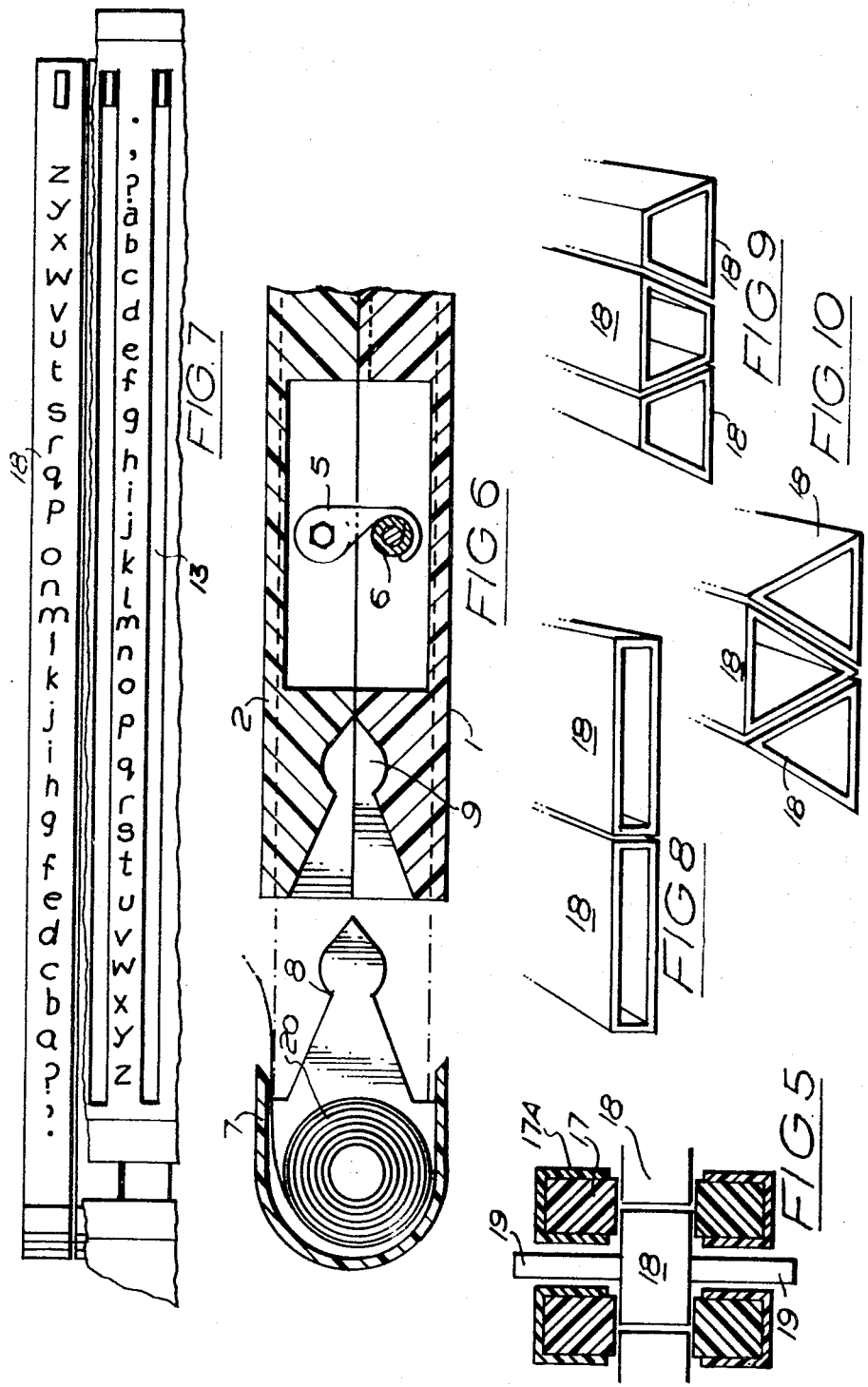

APPARATUS FOR FORMING AND DISPLAYING WORDS OR NUMERALS OR A SERIES OF NUMERALS AND SYMBOLS

This invention relates to improvements in apparatus for forming and displaying letters, numerals or symbols a sequence of letters, numerals or symbols.

The apparatus is particularly applicable for teaching educational subjects such as spelling and arithmetic by the display of the alphabet or numerals in horizontal rows with means for bringing any required letter or numeral into a window in the apparatus for displaying the desired word, sentence or numeral answer.

According to the invention the apparatus comprises a frame containing a plurality of strips each inscribed with a series of letters, numerals or symbols, each strip being provided with means for moving each strip independently of adjacent strips to bring a selected letter, numeral or symbol on each strip or disc opposite a window slot in the frame, the window extending transversely of the strips so that the selected letters, numerals or symbols in the window are in the selected sequence.

Figure 2:
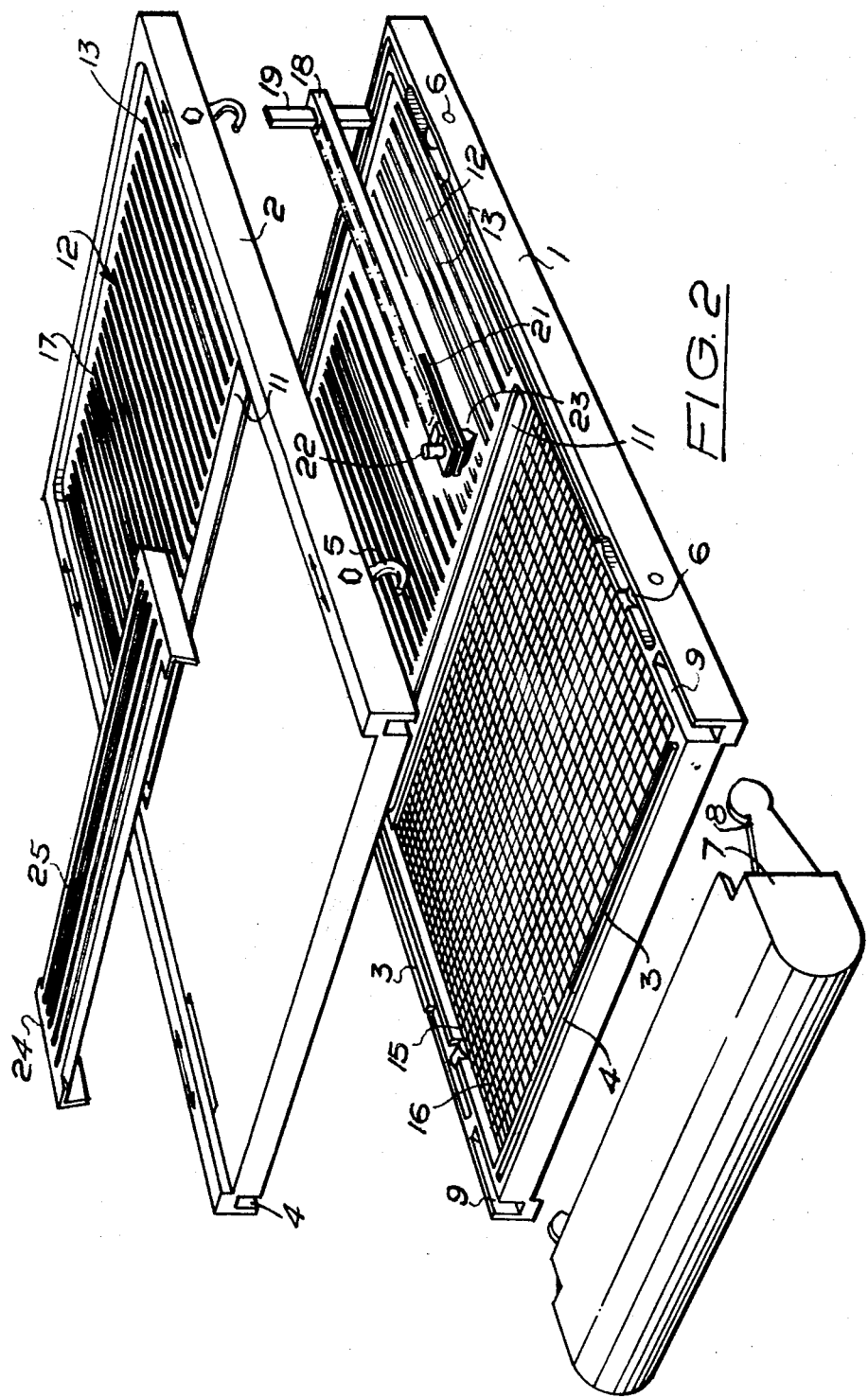

The invention will be described with reference to the accompanying drawings:

FIG. 1 is a perspective view of the apparatus;
FIG. 2 is an exploded perspective view of the same;
FIG. 3 is a plan view enlarged of part of the frame;
FIG. 4 is a part longitudinal section on line 4—4 of FIG. 3;
FIG. 5 is a part transverse sectional on line 5—5 of FIG. 3;
FIG. 6 is a part longitudinal section of one end of the frame;
FIG. 7 is a fragmentary plan view of the opposite side of the frame;
FIGS. 8, 9, 10 are perspective views of modified forms of sliders.

In the construction shown in FIGS. 1 to 7 the apparatus comprises a rectangular frame formed in two sections 1, 2 preferably identical for ease in manufacture with tongues 3 on one section engaging slots 4 in other section for location purposes. The two sections 1,2 are secured together by hooks 5 on one section engaging pins 6 on the other section, the hooks being operated by a key through the side of the frame. The arrows on the frame indicate the direction to turn the key to open and close the hooks. One end of the frame sections 1,2 are closed by an end cover 7 provided with tongues 8 located in recesses 9 in the sections 1,2.

Each section 1,2 of the frame is divided into two portions by a transverse slot 11 forming a window in each section substantially midway between the ends.

One surface 12 of each section 1,2 is formed with a plurality of slots 13 extending through the sections from adjacent one end of the section to adjacent the window and the underside of the other surface 14 of each section 1,3 (FIG. 2) is formed with a plurality of transverse rows of grooves 15 and a plurality of longitudinal rows 16 of grooves crossing the rows of grooves 15.

Lands 17 are formed between the slots 13 on the outer surfaces of the section 2 and inscribed with longitudinal columns of letters, numerals or symbols as illustrated in FIG. 3 and the section 1 is similarly inscribed with longitudinal columns of differing symbols, such as the alphabet, on each land, the spacing of the letters, numbers or symbols being the same on each section 1,2.

A plurality of sliding strips 18 each inscribed with letters, numerals or symbols on each side are arranged and spaced within the frame to correspond with the spacing and letters, numerals or symbols on the lands 17. An operating bar 19 extends vertically through each strip at one end to extend through a longitudinal slot 13 of each section.

The opposite end of the strip 18 is formed with a horizontal slot 21 to render the end resilient. A guide peg 22 projects vertically from the slotted end of the strip to engage a longitudinal groove 16 in the section 1 or 2 and with a rib 23 on the opposite side of the strip 18 to engage the slots 15 in the transverse rows of the other section.

The strips 18 are mounted to slide in the frame sections 1,2 with the bars 19 projecting above the two outer surfaces of the sections 1,2. Movement of each strip 18 in the slot 13 to bring the bar 19 opposite a selected letter, numeral or symbol on the land 17 displays the same letter, numeral or symbol on the strip in the window slot 11 and thus by selecting a numeral 2 on one slide and a numeral 5 and 3 on two other slides (FIG. 3) the numerals 2,5 and 3 are displayed in the window slot 11 and by selecting letters in sequence in the slots words or sentences are displayed in the window slot 11 on one side of the frame and alternatively by turning the frame over the numerals, letters or symbols on the opposite side of the frame and strips may display $1 + 1 = 2$ or other mathematical equations.

The ends of the strips 18 remote from the bars 19 are guided in the grooves 16 by the pegs 22 with the ribs 23 springing over the lands between the transverse rows of grooves 15 on the inner side of one section to span the groove 16 and engage a transverse groove 15 on each side thereof, the ribs 23 locating the strip at each selected letter, numeral or symbol and during movement riding over the lands between the rows of grooves 15 due to the resilience provided by the slot 21 in each strip 18. The surface 14 is applied to the other section so that both sections are interchangeable and enables the sliders 18 to be reversed in the sections.

The letters, numerals or symbols may be formed on the face 17a of a U shaped sleeve secured to the lands 17 as shown in FIG. 5.

The strips 18 may alternatively be shaped as shown in FIG. 8 or as shown in FIG. 9 or FIG. 10.

The end cover 7 may contain a roll of paper 20 as shown in FIG. 6 an end of the roll being brought out on to the outer surface of the section 2 as shown or on to the outer surface of the section 1.

A plate 24 may be sprung between longitudinal rims on the sections to extend transversely of the frame, transverse slots 25 being provided in the plate through which lines may be inscribed on the paper which is then drawn over the section towards the window slot 11 and used for recording the words or symbols shown in the window slot.

The width of the frame and the number of strips provided is governed by the number of words or sentences or the number of numerical expressions which it is desired to select and display at any one time.

The letters, numerals and symbols may be arranged in any predetermined sequence and may be used to encourage children or others to learn by selecting a predetermined letter or other symbol and may effect a saving in consumable materials during teaching.

What I claim is:

1. Apparatus for displaying letters, numerals and/or symbols, or a sequence of letters, numeral and/or symbols comprising two frame sections secured together one above the other, means defining transverse window slots in each of said sections intermediate the ends of said sections, means defining a plurality of side by side longitudinal slots separated by lands in each of said sections with each longitudinal slot extending from one end of the section to adjacent the window slot, a plurality of strips longitudinally slidably mounted in the frame between said sections, there being one strip in each of said slots, means providing similar columns of corresponding letters, numerals and/or symbols on said strips and lands, means on each strip projecting through the associated longitudinal slot for manually sliding that strip to display a selected letter, numeral or symbol at said window slot, and cooperating resiliently coacting holding formations on said sections and each strip within the frame for indexing the selected letter, numeral and/or symbol at said window slot.

2. Apparatus as defined in claim 1, wherein said strips have columns of letters, numerals and/or symbols on both sides and are reversible for coaction with either window slot.

3. The apparatus defined in claim 1, wherein said holding formations comprise grooves in adjacent inner surfaces of said sections and coacting ribs on said strips.

4. Apparatus as defined in claim 1, wherein there are columns of letters, numerals and or symbols on the lands of each of said sections, the columns being the same on each section but different on the respective sections, and there being columns of letters, numerals and/or symbols on both sides of each strip, the columns of one side being the same and the same as the columns on the lands of one of said sections, and the columns on the other side being the same and the same as the columns on the other of said sections.

5. Apparatus for displaying letters, numerals and symbols as in claim 1 in combination with a cover closing one end of the two sections, a roll of paper enclosed within the cover, and a transverse slotted plate externally slidably mounted on one section under which the end of the paper from the roll passes.

6. Apparatus for displaying letters, numerals and symbols as in claim 1 in which the two sections of the frame are secured together by hooks on one section releasably engaging pins on the other section.

7. Apparatus for displaying letters, numerals or symbols or a sequence of letters, numerals or symbols comprising two longitudinally slotted sections arranged one above the other to form a frame, lands between the longitudinal slots inscribed with identical columns of letters, numerals and symbols, a plurality of slide strips each inscribed with an identical column of letters, numerals and symbols slidably mounted between the sections, a bar passing through each strip and the corresponding longitudinal slot by which the strips are moved, transverse window slots extending through each of said sections in which a selected letter, numeral or symbol of a strip is displayed, the sequence of letters, numerals or symbols displayed by strips in the window slot depicting words, sentences, or mathematical expressions, means defining a plurality of longitudinal internal guide grooves in each section, means defining a plurality of transverse internal guide grooves in each section intersecting said longitudinal grooves, each slide strip at one end remote from the bar comprising a peg on one surface and a rib on the other surface engaged in said longitudinal and transverse guide grooves respectively, a horizontal slot formed in said one end of the slide strip to give resiliency thereto, and said longitudinal and transverse guide grooves being formed in adjacent internal surfaces of said sections and separated from the said longitudinal slots by the transverse window slots in each section.

* * * * *